Jan. 18, 1938.   R. C. McCARTY   2,105,748
HYDRAULIC BRAKE LOCKOUT
Filed May 27, 1936
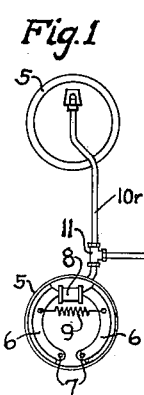
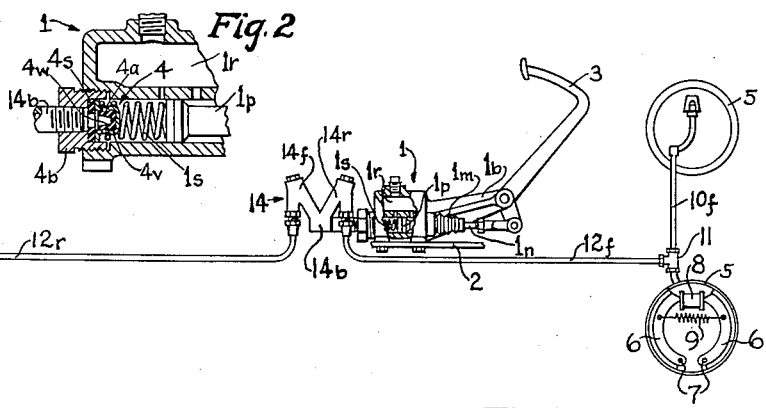
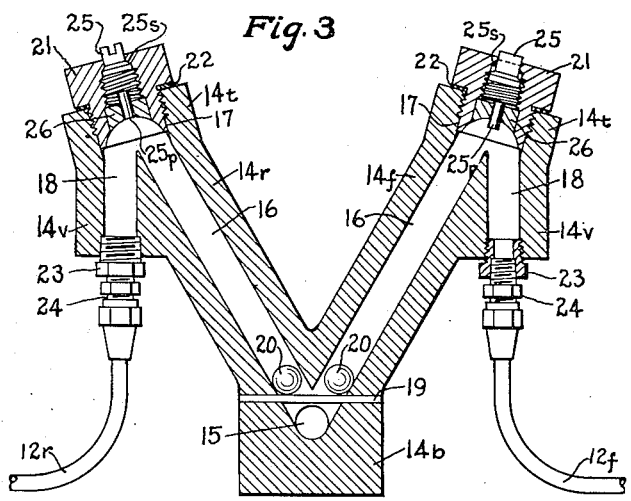
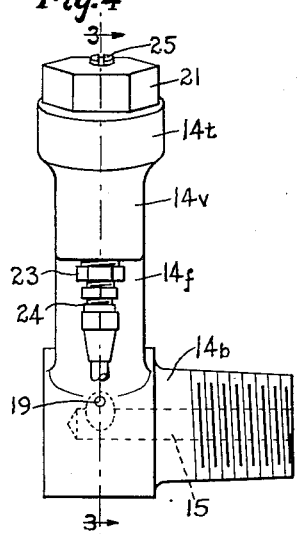
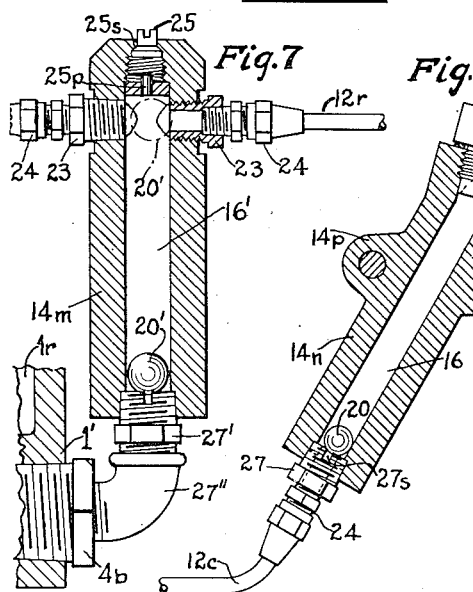
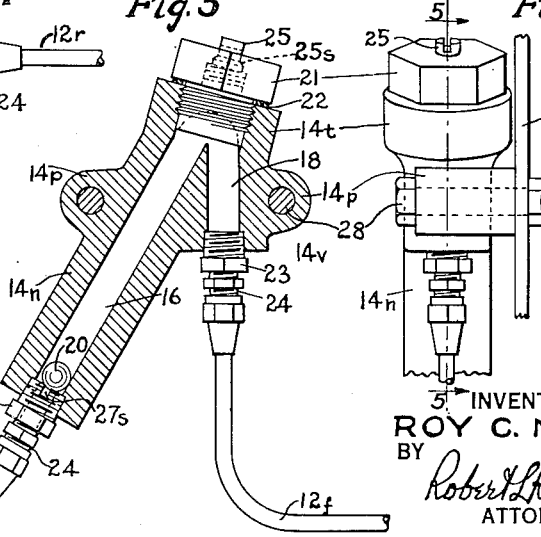
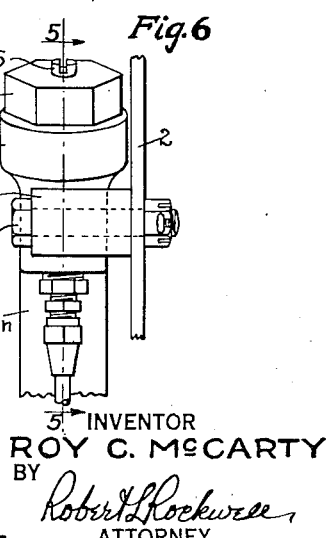
INVENTOR
ROY C. McCARTY
BY Robert L. Rockwell
ATTORNEY Patented Jan. 18, 1938

2,105,748

UNITED STATES PATENT OFFICE 2,105,748

HYDRAULIC BRAKE LOCKOUT

Roy C. McCarty, Seattle, Wash., assignor of two-ninths to Earl J. McAllister, three-ninths to John H. Von Harten, both of Seattle, Wash., and two-ninths to Ralph G. Bale, Spokane, Wash.

Application May 27, 1936, Serial No. 82,078

4 Claims. (Cl. 303—84)

This invention relates to hydraulic brake systems in general, and particularly to improvements in hydraulic brake lockouts used to isolate automatically any faulty brake lead or appended portion of said systems.

The usual hydraulic brake system for automotive vehicles consists essentially of a foot operated master cylinder with which is associated a liquid reservoir; a brake cylinder, a pair of brake shoes, and a brake shoe retraction spring for each wheel to be controlled; suitable tubing leads for connecting the several brake cylinders in pairs and to the master cylinder, and a liquid completely filling and common to all of the operating parts.

Such a system provides easily operated and powerful means for producing equalized brake-shoe forces only so long as all parts of the system are filled with the pressure transmitting liquid. In case a leak develops in any part of the system—although of only minute proportions under ordinary pressures—it may allow sufficient liquid to leave the system under the high pressures produced when the brakes are applied, to render the entire system inoperative before the vehicle can be brought to a stop. This element of uncertainty materially increases the accident hazard.

In order to assure the transmission of equalized pressures to each wheel of the pair, it is standard practice in hydraulic brake systems to provide a separate tubing lead from the master cylinder to each pair of wheels to be controlled.

The device of my invention preferably is inserted between the master cylinder and the master cylinder end of the aforesaid leads.

Said device in its elemental form comprises a body portion providing a straight surgeway, preferably disposed with its axis at an angle with the horizontal, a valve element slightly smaller than the bore of said surgeway, a stop for said valve element near the lower end of the surgeway, a valve seat for the valve element near the top of the surgeway, and means for connecting the device in series with the tubing lead to be controlled.

The proportions of the surgeway bore and valve element are made such that said element is forced upwardly in the surgeway for a portion only of its length each time the normal surge of liquid is forced from the master cylinder into the brake cylinders to which said lead is connected. When the liquid surges back into the master cylinder upon releasing the brakes, said valve element returns to its initial position at the lower end of the surgeway.

In case a leak in a given lead containing my device should occur, obviously more liquid than that required to operate the brake cylinders will be forced through said lead and its connected lockout device, and the valve element will traverse a greater length of the surgeway and will be forced onto the valve seat controlling the defective lead, thus preventing any further loss of liquid and permitting the brake equipment of the other wheels to function in the usual manner.

It will be apparent to those skilled in the art, that upon removing the foot from the brake pedal the piston of the master cylinder is returned quickly to its initial position against a stop chiefly by the force exerted by the piston spring within said cylinder, thus drawing a full supply of liquid from the reservoir; whereas the retraction springs return the operated brake shoes and the wheel cylinder pistons more slowly to their normal or off position, thus forcing the brake liquid through the spring loaded master-cylinder valve into the master cylinder and through the by-pass port into the reservoir. Because of the spring load on said master cylinder valve there is a pressure in the active tubular leads in a normally tight system that continues after the brakes have been released, and I take advantage of said pressure for the maintenance of the aforesaid valve element of my lockout device on its valve seat in case a leak occurs, thus enabling the driver to maintain operative, although reduced, braking control of the vehicle until the necessary repairs can be made.

An object of my invention is to provide improved means for automatically isolating any brake lead of a hydraulic brake system that may develop a leaking condition that would otherwise dissipate the pressure transmitting fluid.

Another object is to provide a device of the kind described in which means are provided to facilitate the removal of entrapped gases when filling the system with liquid.

A further object is to provide a device of the kind described that is simple and inexpensive in construction, reliable in operation and easy to install and maintain.

Other objects and advantages will be apparent to those skilled in this art from the following detail description of a preferred form of the invention, which consists of certain parts and combination of parts, hereinafter described, illustrated in the accompanying drawing and embraced in the appended claims.

In the drawing:

Figure 1 is a diagram of a conventional hydraulic brake system embodying one form of my invention for automatically isolating either of the two principal tubing leads serving the front and rear wheel pairs respectively, and adapted to connect directly with the master cylinder.

Fig. 2 is a sectional elevation taken on the axis of the bore of the master cylinder of Fig. 1 to a larger scale, showing the construction of the master cylinder valve.

Fig. 3 is a sectional elevation of one form of the invention on broken line 3—3 of Fig. 4, which is a side elevation of the same.

Fig. 5 is a sectional elevation of another form of the invention, adapted to be connected at any convenient place in the tubing lead to be controlled, taken on broken line 5—5 of Fig. 6, which is a side elevation of the same.

Fig. 7 is a mid-sectional front elevation of an embodiment of the invention in its elemental form.

Like reference numerals are used to indicate like parts throughout the drawing, wherein 1 refers to the master cylinder shown diagrammatically in Fig. 1 having an oil reservoir compartment 1r, brake pedal fulcrum bracket 1b, piston 1p, piston push rod 1n, and piston spring 1s, and flexible enclosure boot 1m. Said master cylinder usually is fixedly secured to the frame of the vehicle 2, and force for the operation of the master cylinder piston is applied by the usual brake pedal lever 3 through the intermediacy of said push rod.

The master cylinder valve 4, shown in Fig. 2 of the drawing, plays an important part in the operation of the system. Said valve comprises a cupped valve element 4v, the open end of which is forced against valve seat 4s by means of piston spring 1s, the side walls formed by the recess in terminal bushing 4b, fixedly secured to the master cylinder, acting as a lateral guide for said cupped valve element. Near the head end of said valve element a groove is provided to receive and retain the head of a skirted second valve element 4w of resilient material, such as rubber. The skirt portion of said valve is adapted to cover a plurality of apertures 4a in the cupped valve element, thus forming a flapper type of outlet valve. With valve element 4w in place, it will be seen that element 4v constitutes a spring loaded return valve that permits liquid to be returned to the master cylinder only when the pressure in the liquid is sufficient to force valve element 4v from its seat. Likewise the valve element 4w permits liquid to be discharged from the master cylinder only when the fluid pressure within said cylinder is greater than that in the tubular leads of the typical hydraulic brake system illustrated in Fig. 1.

The dual type of hydraulic brake lockout of my invention 14 is illustrated diagrammatically as screwed into terminal bushing 4b of the master cylinder.

A brake drum 5 for each of the four wheels is operatively associated with a pair of brake shoes 6, pivotally mounted at 7, and held in resilient engagement with the usual piston elements (not shown) of brake cylinders 8 by means of brake shoe retraction springs 9.

The front wheel brake cylinders usually are connected together to form a pair by means of cross tubing 10f, and the rear wheel brake cylinders are similarly connected by cross tubing 10r. The fittings 11 and tubing leads 12f and 12r connect the front and rear brake cylinder pairs to the respective terminals of the automatic lockout device.

The preferred form of my invention shown in Figs. 1, 3 and 4, hereinbefore referred to, may be bifurcated to provide two surgeway legs 14f and 14r, having common origin in body portion 14b which provides a laterally projecting threaded portion adapted to be screwed into the threaded terminal bushing 4b of the master cylinder, as previously described. Near the upper end of each of said surgeway legs is a downwardly projecting lug 14v. For convenience in manufacture a boss 14t may be provided at the junction of each leg and its appended lug.

The aforesaid body portion may be drilled to provide a conduit 15 to transmit the liquid, from the master cylinder to the lower ends of surgeways 16 in the leg portions. Bosses 14t may be drilled and tapped next as at 17, then said surgeways 16 and a continuation thereof forming a valve drop 18 may be drilled and reamed in each leg and lug respectively through the openings previously provided in their respective bosses. In this way the alignment of each surgeway and its connecting valve drop may be assured, and the manufacturing operations facilitated.

A through pin 19 may be provided as a bottom stop for valve elements 20, preferably of firm yet resilient vulcanized rubber ground accurately to size. Said valve elements may be inserted conveniently through their respective boss openings, which in turn are closed by means of threaded closure plugs 21, a tight joint being assured by means of gasket washers 22. The inner end of each closure plug is provided with a recess, spherical segment in shape, to assure the unobstructed movement of the valve element from the surgeway into the valve drop. At the lower ends of the valve drop bosses threads are provided to receive taper threaded valve seat elements 23, which provide interior threads to receive one end of standard tubular terminal connectors 24, which in turn serve to connect the respective brake cylinder leads to the master cylinder, each through the intermediacy of an automatic lockout element.

After the hydraulic brake system is assembled as illustrated in Fig. 1, it is completely filled with a suitable liquid, the details of which are well known to those skilled in this art. An all-important requirement of the aforesaid operation is the removal of gases, such as air, from the conduit and operating element spaces. To facilitate this, I provide threaded vent valves 25 in closure plugs 21. Each of said plugs is threaded to receive one of said valves and is provided with a valve seat 25s against which the same may be forced by means of a screw driver or similar tool after all of the air has escaped; plugs 21 previously having been only loosely screwed into place so as to permit the escape of air along their respective threads, and then each firmly seated against its gasket washer.

Each vent valve 25 is retained within the limits of the threaded aperture in its closure plug by means of a stop piece 26 providing an axial aperture through which a pin 25p formed at the lower end of said valve may pass. Upon screwing the vent valve away from its seat to permit the escape of air, said pin projects into the closure plug recess, as shown at the right in Fig. 3, and prevents the valve element from passing from the surgeway into the valve drop due to the flow of liquid while the air is being ejected. When the system is completely filled with liquid and all air vents are closed, it is ready for operation.

It will be clear from the foregoing description that the device of my invention is so positioned that when the brake pedal is depressed to apply the brakes, it in turn moves the piston within the master cylinder. The surge of liquid forced thereby from the master cylinder divides, part flowing through each surgeway and its valve drop continuation, and then through their respective connecting tubular leads, each conducting liquid and the pressure therein to a pair of brake cylinders. I proportion the bore and length of the surgeway so the volume thereof is greater than the volume of liquid constituting the surge that must flow therethrough for the normal operation of a pair of brake cylinders, hence the valve element will be forced to travel upwardly with the liquid only a portion of the length of the surgeway for each normal service application of the brakes.

When the pressure on the brake pedal is released, the brake shoe retraction springs return their respective brake shoes and the wheel cylinder pistons to their normal or off position, which in turn force a return surge of the brake fluid back through the tubular leads, valve drops and surgeways of the lockout device and through the spring loaded return valve into the master cylinder, thus carrying the valve elements of said lockout device downwardly to their respective initial or off positions against the stop pin, past which the brake fluid is free to flow in either direction.

In case a leak develops in any portion of the system connected to one of the automatic brake lockout terminals, when the brakes are applied the high pressures developed in the liquid force a comparatively large proportion of the surge volume required to apply the brakes through a comparatively small orifice in a very short length of time. This increase in the volume of liquid flow through a given surgeway carries the valve element therein against the valve seat, where it is held by the pressure in the brake fluid, thus preventing the further escape of fluid and permitting the brakes of the other pair of wheels to be applied without any interruption in the braking operation. Although the total braking effort is thereby considerably reduced, the driver still has operable control of the car.

After the aforesaid lockout valve element has been forced onto its valve seat and the brakes released as previously described, the fluid pressure maintained by the contractive force of the brake retraction springs in forcing spring loaded valve element 4v from its seat is effective in continuing to force said lockout valve element against its valve seat while the brake fluid is being returned to the master cylinder.

Because of the spring loading of valve 4v, when the pressure of said brake fluid decreases to where it will no longer force said valve from its seat, the brake fluid ceases to flow from the operative portion of the system back into the master cylinder. The retractive force then exerted by the brake shoe springs continues, however, and maintains a brake fluid pressure that is sufficient to hold the aforesaid lockout valve on its seat for a considerable, although indefinite, length of time.

When using the form of the invention shown in Figs. 1, 3, 4, 5, and 6, in case of a slight fluid leak past any of the then operable cylinders of the system resulting in loss of pressure in the fluid, the force of gravity will hold said lockout valve element against its valve seat until the brake pedal is again depressed, thus assuring the future operation of the balance of the braking equipment, no matter how long the time may be between its periods of use.

At any convenient time after the leak has developed, the faulty tubular lead may be disconnected, the valve element pushed upwardly into the top of the surgeway by any suitable probe, and the necessary repairs made to stop the leak, all without serious inconvenience to the driver.

While the foregoing description is directed particularly to a form of the device adapted to be connected directly to the master cylinder and devised to control the two main tubular leads of the system, the form of my invention illustrated in Figs. 5 and 6 of the drawing is adapted to be used in any single lead. All of the essential operative parts of this form of the device are identical with those of the form shown in Figs. 4 and 5. Instead of using the body portion to provide the inlet connection direct, the lower end of the surgeway leg portion 14n of the body structure is threaded to receive a bushing 27 which is slotted as at 27s so it will serve also as a substitute for stop pin 19. Said bushing receives a standard tubular connector 24 for connecting the device to tubing 12c, that in turn may be connected to the master cylinder. Its operation is identical to that of the form hereinbefore described, except that it does not protect against leaks in the tubing and connectors that may develop between it and the master cylinder. Lugs 14p provide means for mounting the device at a convenient place on frame 2 of the vehicle by means of bolts 28.

Another and simpler form of my invention is illustrated in Fig. 7 of the drawing, and comprises a straight cylindrical body portion 14m similar to a surgeway leg of the form of the device shown in Figs. 3 and 4. Near the upper end of surgeway 16' threaded apertures are provided to receive valve seat elements 23 and their appended tubular connectors 24. The lower end of the surgeway is provided with threads adapted to receive bushing 27', which serves as a stop for valve element 20', and serves also to connect the device to any suitable inlet connection, such as elbow 27'' used to make connection with terminal bushing 4b of a master cylinder 1'. When a plurality of tubular brake leads are to be controlled, this form of the device preferably is mounted with the axis of the surgeway at an angle of 90 degrees with the horizontal, and the cross-sectional area of the bore of the surgeway is made approximately twice that for a single element of the form shown in Figs. 3 and 4 for the same service. A vent valve 25 may be provided at the upper end of the surgeway to facilitate the removal of air, as hereinbefore described.

In case a leak occurs in a brake lead connected to the aforesaid form of the invention, the valve element is forced upwardly in the surgeway and against the valve seat controlling fluid flow into the faulty lead, as indicated by the dot and dash outline of the valve element in Fig. 7. It will be noted that when the valve element is in this position, ample space is provided automatically for the flow of fluid through the other valve seat means, and that use is made of the fluid pressure produced by the brake retraction springs of the operative brakes to maintain the valve element on the valve seat indicated between the service applications of said brakes, as previously explained.

While I have illustrated and described my invention in its preferred forms for a particular use, it will be apparent to those skilled in the art, that the combination of essential coacting elements of the device may be adapted and applied to various other uses and in other forms than those illustrated without departing from the purpose and intent of said invention within the scope of the appended claims.

For example, instead of positioning the body element so the surgeway is at an angle with the horizontal and using the force of gravity to urge the valve element into engagement with the stop element in the lower portion of the surgeway, the surgeway may have any other position and a suitable spring or other resilient means may be used to urge the valve element against the stop. Furthermore, while I prefer to use a rubber ball for the valve element in each of the forms illustrated, it will be obvious to skilled mechanics that the valve element may be made of other materials and in other shapes, especially when a straight surgeway is employed and a single valve seat is positioned at one end of the surgeway. Obviously, the valve element then may be cylindrical in shape.

Having described my invention what I claim as new and desire to protect by Letters Patent is—

1. In a device of the kind described, a body element providing an upright surgeway for a pressure transmitting fluid, valve means movable upwardly within said surgeway by the surge flow of said fluid, stop means for said valve element in the lower portion of the surgeway, and a plurality of valve seat means in the side wall of the upper portion of the surgeway each adapted to be closed singly by said valve means when the fluid surge passing upwardly through said surgeway and outwardly through that valve seat means exceeds a predetermined amount.

2. The combination with the master cylinder of an hydraulic brake system, of a body element providing an upright surgeway fixedly connected at its lower end to the fluid outlet of said master cylinder for the transmission of the pressure fluid of said system, valve means movable upwardly within said surgeway by the surge flow of said fluid, and a plurality of valve seat means in the side wall of the upper portion of said surgeway each adapted to be closed singly by said valve means when the surge flow of said fluid passing upwardly through said surgeway and outwardly through that valve seat means exceeds a predetermined amount.

3. In a device of the kind described, an upright body element having a surgeway for the pressure transmitting fluid of an hydraulic brake system the upper end of said surgeway being the highest point in said system, valve means freely movable within said surgeway by the surge flow of said fluid, a plurality of valve seat means in the side wall of the upper portion of said surgeway each adapted to be closed singly by said valve means when the surge flow of said fluid passing upwardly through said surgeway and outwardly through that valve seat means exceeds a predetermined amount, and vent valve means at the upper extremity of said surgeway having a portion that prevents said valve means from closing any of said valve seat means so long as said vent valve means is open.

4. The combination with the master cylinder of an hydraulic brake system, of a body element having an upright surgeway and a plurality of side apertures connecting with the upper portion of said surgeway, means for joining said body element to said master cylinder to connect the lower end of said surgeway with the discharge opening of said master cylinder, a valve means in said surgeway movable upwardly therein by the surge flow of fluid from said master cylinder, and outlet means adapted to be fixedly secured in each of said side apertures to provide at its inner end a valve seat closable by said valve means when the fluid surge passing upwardly through said surgeway and outwardly through that outlet means exceeds a predetermined amount.

ROY C. McCARTY.